United States Patent Office 3,510,521
Patented May 5, 1970

3,510,521
BRANCHED FATTY TETRAAMINES AND ALKYL AND ALKOXY DERIVATIVES THEREOF
Eugene J. Miller, Jr., Wheaton, Ill., Ago Mais, Trenton, N.J., and Donald J. Berenschot, Chicago, and Robert L. Berger, Elmhurst, Ill., assignors to Armour Industrial Chemical Company, Chicago, Ill., a corporation of Delaware
No Drawing. Continuation-in-part of application Ser. No. 410,014, Nov. 9, 1964. This application July 25, 1968, Ser. No. 747,469
Int. Cl. C07c *87/20, 91/12, 93/02*
U.S. Cl. 260—583          5 Claims

ABSTRACT OF THE DISCLOSURE

Branched fatty tetraamines, their alkyl and alkoxylated derivatives, their synthesis and their use as epoxy resin curing agents, as corrosion inhibitors, and as agricultural chemicals.

---

This application is a continuation-in-part of application Ser. No. 410,014, filed Nov. 9, 1964, now Pat. No. 3,418,374, issued Dec. 24, 1968.

This invention relates to novel derivatives of fatty acids, and more particularly to a novel class of fatty tetraamines which are useful as novel epoxy resin curing agents, as corrosion inhibitors, as agricultural chemicals and for the synthesis of other difunctional derivatives of fatty acids.

It has long been the desire of chemists to synthesize or to extract from natural substances compounds which not only possess the desirable physical and chemical properties of the long chain fatty acids, but also contain more reactive groups therein. With more reactive groups, the fatty compound would not only have good hydrophobic characteristics, but also have high potency, depending upon its reactive group type for surfactant, for polymeric, or for other chemical activities.

Among the approaches made toward accomplishing such an objective, that disclosed in U.S. 2,813,113 is typical. There the oxidation of oleic acid $$[CH_3(CH_2)_7CH=CH(CH_2)_7COOH]$$

to azelaic acid [HOOC(CH$_2$)$_7$COOH] is discussed. Unfortunately, chain cleavage occurs in such oxidation. This is undesirable because it is detrimental to the hydrophobic nature of the resultant compound.

Roe and Swern of the U.S. Department of Agriculture, in the Journal of the American Oil Chemists Society 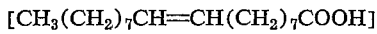 periodical, vol. 37, pp. 661 to 668 (1960) report that unsaturated fatty acids may be carboxylated with carbon monoxide. The monoxide adds to the double bond. Such a reaction would conserve the hydrophobic nature of the fatty acid, but apparently no further work was done toward discovering new difunctional fatty compounds. This is unfortunate because, as discussed below, it has been found that such difunctional compounds may be synthesized rather easily and they possess many attributes highly desirable for various chemical technologies.

Accordingly, an object of this invention is to provide novel difunctional fatty compounds which are useful in various chemical technologies.

Another object is to provide a novel class of fatty tetraamines.

Still another object is to provide novel methods for the manufacture of such tetraamines.

A further object is to provide a novel class of compounds which are good epoxy resin curing agents.

A still further object is to provide novel corrosion inhibitors.

Another object is to provide novel agricultural chemicals.

A still further object is to provide a novel class of compounds which are excellent intermediates for other difunctional fatty compounds having valuable properties for various chemical technologies.

Other objects of the invention will in part be obvious and will in part appear hereinafter.

It has now been found that a novel class of fatty tetraamines may be prepared by cyanoethylating the polyamine precursor of the desired tetraamine using acrylonitrile as described in copending application Ser. No. 398,438 filed Sept. 22, 1964, now U.S. Pat. No. 3,364,248. The resultant diaminodinitrile is then hydrogenated using a hydrogenation catalyst such as Raney nickel. The resultant tetraamine may then, if desired, be alkylated or alkoxylated. For example, by reacting aminomethylstearylamine with acrylonitrile, N,N'-di-(2-cyanoethyl)aminomethylstearylamine is formed. This compound is then hydrogenated using Raney nickel and then, if desired alkylated with formaldehyde in the presence of Raney nickel and hydrogen to form N,N,N',N',N'',N'''-hexamethyl-N'',N'''-di-(3-aminopropyl) aminomethylstearylamine, or else alkoxylated with ethylene oxide in the presence of a base to form ethoxylated di-(3-aminopropyl) aminomethylstearylamine.

The invention accordingly comprises the several steps and the relation of one or more of such steps with respect to each of the others, and the compound possessing the features, properties, and the relation of elements, which are exemplified in the following detailed disclosure, and the scope of the invention will be indicated in the claims.

Reference is now made to the following examples which illustrate the invention in detail:

EXAMPLE I

N,N'-di-(2-cyanoethyl) aminostearylamine

A two-liter four neck Morton flask equipped with a mechanical stirrer, thermometer and reflux condenser is charged with 13 gms. water and 142 gms. (0.5 mole) aminostearylamine.

The temperature is raised to 70° C. and acrylonitrile (59 gms. 1.11 moles) is added with vigorous stirring over a period of one hour. The temperature is maintained at 70° C. during the addition, then raised to 80° C. for an additional two hours. Excess acrylonitrile and water are removed in vacuo to yield 192.4 gms. (98.7% theory) of di-(3-cyanoethyl) aminostearylamine as a light oil.

Analysis:
  Neut. equivalent—198.6 (calc'd. 195)
  Primary amine—3.3%
  Secondary amine—93.6%
  Tertiary amine—Nil

EXAMPLE II

Hydrogenation of N,N'-di-(2-cyanoethyl) aminostearylamine

A 300 ml. stirred autoclave is charged with 150 gms. (0.39 mole) of di-(2-cyanoethyl) aminostearylamine and Raney nickel (3.7 gm., 2.5% by wt. of nitrile). Ammonia (520 p.s.i.g./165° C.) is charged into the reactor and the pressure raised to 2100 p.s.i.g. with hydrogen at 165° C. This pressure and temperature (2100 p.s.i.g./165° C.) should be maintained for about four hours and then the reaction mixture should be cooled, vented and filtered. It will give approximately 142.4 gm. (93% of theory) of di-(3-aminopropyl) aminostearylamine as a pale yellow oil.

Analysis:
- Neut. equivalent—103 (calc'd. 98.5)
- Primary amine—40.5%
- Secondary amine—52.5%
- Tertiary amine—0.26 meq./gm.

EXAMPLE III

N,N'-di-(2-cyanoethyl)aminomethylstearylamine

A 250 ml., 3-neck flask equipped with a mechanical stirrer, thermometer, dropping funnel and heating mantle is charged with aminomethylstearylamine (50.0 gms., 0.168 mole; N.E., 158.5) and water (4.52 ml., 9% by wt. of amine). The aminomethylstearylamine has the following physical chemical properties:

TABLE I

Solubility data (weight to weight basis) at 25° C.

| | Percent |
|---|---|
| Isopropanol | 10 |
| Benzene | 10 |
| Iso-octane | 10 |
| Kerosene | 10 |
| Skellysolve F | 10 |
| Mineral oil | 10 |
| Water | Insoluble |

Physical properties

| | |
|---|---|
| Theor. mol. wt. | 298.5 |
| $n_D^{20}$ | 1.4685 |
| N.E. | 156.5 |
| I.V. | 1.80 |
| Percent PA | 95.4 |
| SA, meq./g. | 0.06 |
| Color and appearance | Gardner 1; liquid |
| Relative density, $d_{25}^{25}$ | 0.859 |
| Viscosity, cps. at 25° C. | 21.31 |
| Surface tension, dynes/cm./$^2$ (25 C.) | 32.04 |
| Gas chromatography: | |
| Percent C-19 diamine | 82.2 |
| Percent C-17 diamine | 10.7 |
| Percent C-15 diamine | 2.7 |

The temperature of the reactants is raised to 70° C. and acrylonitrile (19.6 gms., 0.37 mole, 10% excess) added slowly with stirring. The addition is complete in about one hour at 70–80° C. The temperature is then maintained at 76–85° C. for an additional two hours. Water and excess acrylonitrile are removed in vacuo to yield 66.5 gms. (97.5% yield) of N,N'-di-(2-cyanoethyl)aminomethylstearylamine as a pale yellow oil.

Analysis:
- Neut. equiv.—212 (calcd. 202.3)
- Secondary amine—92.2%

EXAMPLE IV

Hydrogenation of N,N'-di-(2-cyanoethyl)aminomethylstearylamine

A 300 ml. stirred stainless steel autoclave is charged with 100 gms. of N,N'-di(2-cyanoethyl)aminomethylstearylamine (0.247 mole) and 10.0 gms. of Raney nickel catalyst (alcohol washer, 10% by wt.). The unit is secured and after it is flushed three times with gaseous ammonia a 250 p.s.i. ammonia pressure is introduced. Pressure is brought up to 1200 p.s.i. with hydrogen gas and heating is started. Temperature is brought up to 165° C. and pressure is maintained at 2000 p.s.i. for four hours. The unit is cooled, vented and opened. The product is removed from the autoclave as a methanol solution. Catalyst is filtered off and the methanol is removed in vacuo. A 100.5 gms. yield of a light oil is obtained (a 98.5% yield).

Analysis:
- Neutr. equip.—102.0 (calc. 103.1)
- Primary amine—50.4%
- Secondary amine—46.4%
- Tertiary amine—2.06%

EXAMPLE V

Alkylation of N,N'-di-(3-aminopropyl)aminomethylstearylamine

A one liter Parr autoclave is charged with 222 gms. (0.5 mole) of N''',N''-di-(3-aminopropyl)aminomethylstearylamine and 8.8 gms. of nickel formate. The reaction mixture is heated to 120° C. and hydrogen is added to 600 p.s.i.g. Formcel, a solution of formaldehyde in methanol (55% active), is then added slowly, over 80 minutes. Total Formcel added should be 139 ml. (2.71 moles). Stirring is continued for 30 minutes after addition of Formcel was complete. The crude product is then filtered and residual methanol and formaldehyde removed in vacuo. The crude produce, N,N,N',N',N''',N''-hexamethyl - N''',N'' - di - (3 - aminopropyl)aminomethylstearylamine will be obtained as an amber oil, 228.7 gms. (87% of theory), having the following analysis:

Neutralization equivalent—147 (calc'd 131.5)
Secondary amine—10.9%
Tertiary amine—78.1%

EXAMPLES VI TO IX

Ethoxylation of N''',N''-di-(3-aminopropyl)aminomethylstearylamine 6 mole adduct.—A 300 ml. stainless steel, stirred autoclave is charged with 44.4 g. (0.1 mole) of N''',N''-di-(3-aminopropyl)aminomethylstearylamine. The amine is heated to 100° C. and 32 ml. (28.4 gm., 0.645 mole) of ethylene oxide is added over a one hour, 43 minute period, maintaining the temperature at 100–115° C during the addition. The product will be obtained as an oil having the following analysis:

Neutralization equivalent—184
Apparent secondary amine—0.74 meq./g.
Tertiary amine—86%

10 mole adduct.—To the above product is added 48 ml. (42.6 gm., 0.968 mole) of ethylene oxide at 100° C. The addition of ethylene oxide should take approximately four hours at 97–105° C. The crude product, after removing excess ethylene oxide, will have the following analysis:

Neutralization equivalent—218
Apparent secondary amine—1.03 meq./g.
Tertiary amine—77.5%
Glycol—12.6

19 mole adduct.—To the above product is added 38 ml. (33.7 gm., 0.767 mole) of ethylene oxide at 100° C. The addition should take approximately eight hours at 90–110° C. A crude product having the following analysis
Neutralization equivalent—322
Apparent secondary amine—0.6 meq./g.
Tertiary amine—81%
will be obtained:

100 mole adduct.—A 300 ml. stainless steel, stirred autoclave is charged with 44.4 g. (0.1 mole) of N''',N''-di-(3-aminopropyl)aminomethylstearylamine and 0.44 gm. of sodium hydroxide. The mixture is heated to 150° C. and 255 ml. of ethylene oxide (226 gm., 5.15 moles) is gradually added over a seven and one-half hour period at 145–175° C. At such time, the reaction mixture should be cooled and 116 gms. of product (N.E., 593; 43.8 moles of ethylene oxide added) can be removed from the reactor. The remaining product (155 gms.) is again heated to 145° C. and approximately 200 ml. (177 gm., 4.0 moles) of ethylene oxide is added over a three and one-half hour period at 125–150° C. The product obtained will be an amber oil which solidifies to a yellow paste having the following analysis:

Neutralization equivalent—1410
Moles of ethylene oxide—118

EXAMPLES X TO XII

Propoxylation of N''', N''-(3-aminopropyl)aminomethylstearylamine

*5 mole adduct.*—A 300 ml. stainless steel, stirred autoclave is charged with 44.4 g. (0.1 mole) of N''', N''-di-(3-aminopropyl)aminomethylstearylamine. The amine is heated to 100° C. and 44.5 ml. (26.9 gm., 0.636 mole) of propylene oxide added over one and one-half hours. The mixture is maintained at 98–106° C. for an additional two hours and a sample of the crude product which will be obtained as an oil, should have the following analysis:

Neutralization equivalent—184
Teritary amine—83%

*6 mole adduct.*—To the above mix is added a catalytic amount of sodium metal and 12 ml. of propylene oxide. The mixture is heated for an additional one and one-half hours yielding a product having the following analysis:

Neutralization equivalent—202
Tertiary amine—94%
Glycol—1.2%

*9 mole adduct.*—To the above product is added an additional 19.0 ml. (15.8 gm., 0.272 mole) of propylene oxide at 100° C. The mixture is heated at 100° for six and one-half hours and at 133–135° for three hours to yield a crude product as an oil having the following analysis:

Neutralization equivalent—336
Tertiary amine—93.5%
Glycol—9.04%

The amino- or aminoalkylfattyamines that may be cyanoethylated with acrylonitrile are those falling within the following formula:

FORMULA I $$CH_3(CH_2)_x CH(CH_2)_y NH_2$$
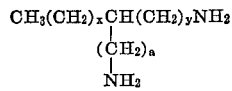

where
$a = 0$ to 2
$x + y = 6$ to 22

Such compounds would include the amino-, aminomethyl-, and the aminoethyl-derivatives of fatty amines such as caprylylamine, caprylamine, laurylamine, myristylamine, palmitylamine, stearylamine, arachidylamine, behenylamine and lignocerylamine or mixtures thereof such as derivable from natural fats and oils such as tallow, soybean oil and coconut oil. In general, diamine derivatives of the $C_8$ to $C_{24}$ fatty acids are useful as a reactant.

The dicyanoethylfattydiamines that are formed using the above amino- or aminoalkylfattyamines are those falling within the following formula:

FORMULA II

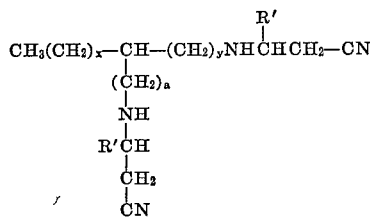

where
$a = 0$ to 2
R' = a radical selected from the group consisting of H— and $CH_3$—
$x + y = 6$ to 22

Such compounds would include N,N'-di(2-cyanoethyl) aminomethylcaprylamine, N,N' - di(2-cyanoethyl)aminomethylundecylamine, N,N'-di-(2-cyanoethyl)aminomethylpalmitylamine, N,N'-di-(2-cyanoethyl)aminomethylstearylamine, and the like.

Any hydrogenation catalyst may be used to convert the dicyanoethylfattydiamine to the tetraamine. Typical catalysts are nickel (especially Raney nickel), platinum, palladium, copper chromite or zinc, and oxides of zinc, nickel, copper, chromium and molybdenum. Concentrations of .05 to 15% of the nitrile can be used. Pressure can range from 15 p.s.i.g. to 3000 p.s.i.g. and temperatures from 25° to 300° C.

If it is desired to alkylate the tetraamine formed to its alkyl derivative, it is subsequently reacted with the appropriate alkylating agent, such as formaldehyde (one to six molar equivalents and preferably in excess of the tetraamine), under alkylting pressure (50 to 500 p.s.i.g.) and temperature conditions (75 to 300° C.) in the presence of hydrogen and a hydrogenation catalyst (as above) under acid conditions, such as glacial acetic acid. Venting to remove water, as formed, is also performed.

If it is desired to alkoxylate the tetraamine formed to the alkoxy derivative, it is subjected, under pressure (3 to 300 p.s.i.g.) and temperature (50 to 300° C.) and under alkaline conditions to an appropriate alkylene oxide, such as ethylene oxide, propylene oxide and the like in accordance with the amount of alkoxy groups one desires to add to the tetraamine. From 2 to 200 moles and more may be added to each amine group. Catalyst concentration ranges between 1.0 to 15.0% of the fatty acid utilized, and the preferred concentration is 10.0% by weight.

The fatty tetraamines, their alkyl and alkoxy derivatives that are formed by the methods of this invention are those which fall within the following formula:

FORMULA III

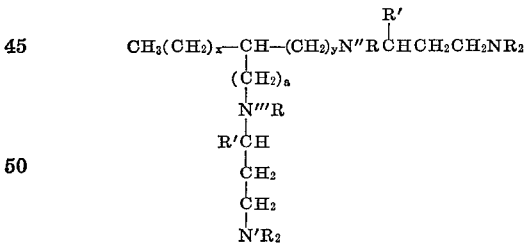

where
R is a radical selected from the group consisting of H—, $CH_3$—, $H(OCH_2CH_2)_e$—,

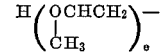

and mixtures thereof where $\epsilon = 2$ to 200
R' is a radical selected from the group consisting of H— and $CH_3$—
$a = 0$ to 2
$x + y = 6$ to 22

Among the fatty tetraamines which fall within the above formula are

N''',N''-di-(3-aminopropyl)aminomethylcaprylylamine,
N''',N''-di-(3-aminopropyl)aminomethylcaprylamine,
N''',N''-di-(3-aminopropyl)aminomethyllaurylamine,
N''',N''-di-(3-aminopropyl)aminomethylmyristylamine,
N''',N''-di-(3-aminopropyl)aminomethylpalmitylamine,
N''',N''-di-(3-aminopropyl)aminomethylstearylamine,
N''',N''-di-(3-aminopropyl)aminomethylarachidylamine,
N''',N''-di-(3-aminopropyl)aminomethylbehenylamine, N''',N''-di-(3-aminopropyl)aminomethyllignocerylamine,
N''',N''-di-(3-aminopropyl)aminoethylcaprylylamine,
N''',N''-di-(3-aminopropyl)aminoethylcaprylamine,
N''',N''-di-(3-aminopropyl)aminoethyllaurylamine,
N''',N''-di-(3-aminopropyl)aminoethylmyristylamine,
N''',N''-di-(3-aminopropyl)aminoethylpalmitylamine,
N''',N''-di-(3-aminopropyl)aminoethylstearylamine,
N''',N''-di-(3-aminopropyl)aminoethylarachidylamine,
N''',N''-di-(3-aminopropyl)aminoethylbehenylamine,
N''',N''-di-(3-aminopropyl)aminoethyllignocerylamine, or mixtures thereof such as derivable from natural fats and oils such as tallow, soybean oil and coconut oil.

Among the alkylated diaminofattydiamines which fall within the above formula are N,N,N',N'',N'''-hexamethyl-N''',N''-di-(3-aminopropyl)aminomethylcaprylylamine,
N,N,N',N'',N'''-hexamethyl-N''',N''-di-(3-aminopropyl)aminomethylcaprylamine,
N,N,N',N'',N'''-hexamethyl-N''',N''-di-(3-aminopropyl)aminomethyllaurylamine,
N,N,N',N'',N'''-hexamethyl-N''',N''-di-(3-aminopropyl)aminomethylmyristylamine,
N,N,N',N'',N'''-hexamethyl-N''',N''-di-(3-aminopropyl)aminomethylpalmitylamine,
N,N,N',N'',N'''-hexamethyl-N''',N''-di-(3-aminopropyl)aminomethylstearylamine,
N,N,N',N'',N'''-hexamethyl-N''',N''-di-(3-aminopropyl)aminomethylarachidylamine,
N,N,N',N'',N'''-hexamethyl-N''',N''-di-(3-aminopropyl)aminomethylbehenylamine,
N,N,N',N'',N'''-hexamethyl-N''',N''-di-(3-aminopropyl)aminomethyllignocerylamine,
N,N,N',N'',N'''-hexamethyl-N''',N''-di-(3-aminopropyl)aminoethylcaprylylamine,
N,N,N',N'',N'''-hexamethyl-N''',N''-di-(3-aminopropyl)aminoethylcaprylamine,
N,N,N',N'',N'''-hexamethyl-N''',N''-di-(3-aminopropyl)aminoethyllaurylamine,
N,N,N',N'',N'''-hexamethyl-N''',N''-di-(3-aminopropyl)aminoethylmyristylamine,
N,N,N',N'',N'''-hexamethyl-N''',N''-di-(3-aminopropyl)aminoethylpalmitylamine,
N,N,N',N'',N'''-hexamethyl-N''',N''-di-(3-aminopropyl)aminoethylstearylamine,
N,N,N',N'',N'''-hexamethyl-N''',N''-di-(3-aminopropyl)aminoethylarachidylamine,
N,N,N',N'',N'''-hexamethyl-N''',N''-di-(3-aminopropyl)aminoethylbehenylamine,
N,N,N',N'',N'''-hexamethyl-N''',N''-di-(3-aminopropyl)aminoethyllignocerylamine, or mixtures thereof such as derivable from natural fats and oils such as tallow, soybean oil and coconut oil.

Among the alkoxylated diaminofattydiamines which fall within the above formula are the ethoxylated and propoxylated N''',N''-di-(3-aminopropyl)aminomethylcaprylylamine,
N''',N''-di-(3-aminopropyl)aminomethylmyristylamine,
N''',N''-di-(3-aminopropyl)aminomethylpalmitylamine,
N''',N''-di-(3-aminopropyl)aminomethylstearylamine,
N''',N''-di-(3-aminopropyl)aminomethylarachidylamine,
N''',N''-di-(3-aminopropyl)aminomethylbehenylamine,
N''',N''-di-(3-aminopropyl)aminomethyllignocerylamine,
N''',N''-di-(3-aminopropyl)aminoethylcaprylylamine,
N''',N''-di-(3-aminopropyl)aminoethylcaprylamine,
N''',N''-di-(3-aminopropyl)aminoethyllaurylamine,
N''',N''-di-(3-aminopropyl)aminoethylmyristylamine,
N''',N''-di-(3-aminopropyl)aminoethylpalmitylamine,
N''',N''-di-(3-aminopropyl)aminoethylstearylamine,
N''',N''-di-(3-aminopropyl)aminoethylarachidylamine,
N''',N''-di-(3-aminopropyl)aminoethylbehenylamine,
N''',N''-di-(3-aminopropyl)aminoethyllignocerylamine, or mixtures thereof such as derivable from natural fats and oils such as tallow, soybean oil and coconut oil.

The compounds of this invention are good epoxy resin curing agents, when used in a concentration of 10 to 50% by weight of the resin, as evidenced by the following tables:

TABLE I.—PROPERTIES OF CAST SHEET OF EPOXY RESIN CURED WITH A TETRAMINE CURING AGENT

| | Epon 828/amine Wt. ratio | Cure | Solvent and solution stability, percent gain in weight | | | | | | | | Physical properties | | |
|---|---|---|---|---|---|---|---|---|---|---|---|---|---|
| | | | Toluene | MIBK* | Mineral spirits | 10% Tide | 10% NaOH | 10% $H_2SO_4$ | Deionized $H_2O$ | Shrinkage | Hardness Shore D, 10 sec. | Dielectric constant |
| Aminomethylstearylamine. | 70/30 | 300° F., 1.5 hr. | 8.30 | 3.03 | 0.19 | 0.42 | 0.23 | 0.92 | 0.28 | Slight | 73 | 2.93 |
| N''',N''-di-(3-aminopropyl)aminomethylstearylamine. | 70/30 | 300° F., 2 hr. | 1.54 | 0.41 | 0.03 | 0.52 | 0.28 | 3.22 | 0.35 | Nil | 76 | 3.10 |

*MIBK—Methyl Isobutyl Ketone.

TABLE II.—PROPERTIES OF A FILM COATING OF ANOTHER EPOXY RESIN CURED WITH A TETRAMINE CURING AGENT

| | Parts per hundred of Epon 1001 resin | Cure | Physical properties | | | | | | | | | | | | |
|---|---|---|---|---|---|---|---|---|---|---|---|---|---|---|---|
| | | | Sward hardness, weeks film has aged | | | | | | Impact | | | | | Flexibility | |
| | | | 1 | 2 | 3 | 4 | 5 | 6 | 1 | 2 | 3 | 4 | 6 | 10 | 5 | 10 |
| Aminomethylstearylamine. | 16.15 | Room temp. | 20 | 22 | | | | | 160 | | 160 | | 160 | 160 | Pass 1/8 | Pass 1/8 |
| | | Baked | 60 | 62 | | | | | 160 | | | | 160 | 160 | Pass 1/8 | Fail 1/8 |
| N''',N''-di-(3-aminopropyl)aminomethylstearylamine. | 14.14 | Room temp. | 38 | | | 36 | | | | | 160 | 160 | 160 | | Pass 1/8 | |
| | | Baked | 24 | | | 26 | | | | | | 160 | 160 | | Pass 1/8 | | propyl)aminomethylbehenylamine,
N,N,N',N'',N'''-hexamethyl-N''',N''-di-(3-aminopropyl)aminomethyllignocerylamine,
N,N,N',N'',N'''-hexamethyl-N''',N''-di-(3-aminopropyl)aminoethylcaprylylamine,
N,N,N',N'',N'''-hexamethyl-N''',N''-di-(3-aminopropyl)aminoethylcaprylamine,
N,N,N',N'',N'''-hexamethyl-N''',N''-di-(3-aminopropyl)aminoethyllaurylamine,
N,N,N',N'',N'''-hexamethyl-N''',N''-di-(3-aminopropyl)aminoethylmyristylamine,
N,N,N',N'',N'''-hexamethyl-N''',N''-di-(3-aminopropyl)aminoethylpalmitylamine,
N,N,N',N'',N'''-hexamethyl-N''',N''-di-(3-aminopropyl)aminoethylstearylamine,
N,N,N',N'',N'''-hexamethyl-N''',N''-di-(3-aminopropyl)aminoethylarachidylamine,
N,N,N',N'',N'''-hexamethyl-N''',N''-di-(3-aminopropyl)aminoethylbehenylamine,
N,N,N',N'',N'''-hexamethyl-N''',N''-di-(3-aminopropyl)aminoethyllignocerylamine,

TABLE III

Properties of a film coating of epoxy resin cured with tetraamine [1]

Epon 1001 (100%) (resin)—100.0 [2]
Silicone resin (flow control agent)—1.00 [2]
N''',N''-di-(3-aminopropyl)aminomethylstearylamine (curing agent)—13.70 [2]
DMP-30 (catalyst)—3.00 [2]
Xylene (solvent)—33.33 [2]
Cellosolve acetate (solvent)—35.00
Sweat in time (Min.)—45
Gardner Holdt viscosity—"L"
Pot life (R.T.)—8+ hrs.
Sward hardness after 24 hrs.—48
Sward hardness after 1 week—60

---

[1] This coating dried in 20 minutes, tack free in 2 hours and dried hard in 4½ hours.
[2] Parts by weight.

TABLE III.—Continued

Impact:
After baking (20 mins. at 375° F.)—20/375°
8th inch mandrel—Passes
Reverse impact—160" lb.
After air dry (7 days at rm. temp.)—7 days
8th inch mandrel—Passes
Reverse impact—160" lb.
Methyl isobutyl ketone resistance—72 to 96 hrs.

From Table III, it should be evident that Epon 1001 when cured with N''',N''-di-(3-aminopropyl)aminomethylstearylamine has very good flexibility. Its solvent resistance even after methyl isobutyl ketone immersion for four days is far better than any other amine tested.

The compounds of this invention also exhibit good weed control.

TABLE IX

[Pre-emergence activity of N''', N''-di-(3-aminopropyl)aminomethyl stearylamine (TTM)]

| Chemical | Conc., lbs./acre | Percent injury to crops | | | | Percent weed control | |
|---|---|---|---|---|---|---|---|
| | | Corn | Wheat | Radish | Soybean | Broadleaf | Grass |
| None (control) | | 0 | 0 | 0 | 0 | [1] 0 | [2] 0 |
| 2,4 dichloro phenoxy | 1.0 | 0 | 90 | 60 | 60 | 100 | 80 |
| 2,4 dichloro phenoxy acetic acid salt of TTM | 0.5 | 0 | 10 | 0 | 90 | 90 | 70 |
| Hexafluoroarsenate salt of TTM | 1.0 | [3] 30 | 0 | [4] D | 80 | [4] D | [4] D |
| | 0.5 | [3] 20 | 0 | 0 | 50 | 75 | 0 |

[1] Heavy stand of pigweed, purslane, lambsquarter, ragweed.
[2] Crabgrass, oxtail.
[3] Percent height shorter than untreated control.
[4] Dwarfed.

It will thus be seen that the objects set forth above, among those made apparent from the preceding description, are efficiently attained and, since certain changes may be made in carrying out the above method and the compounds set forth without departing from the scope of the invention, it is intended that all matter contained in the above description shall be interpreted as illustrative and not in a limiting sense.

Now that the invention has been described:
What is claimed is:

1. The fatty tetraamines and their alkyl and alkoxy derivatives falling within the formula:

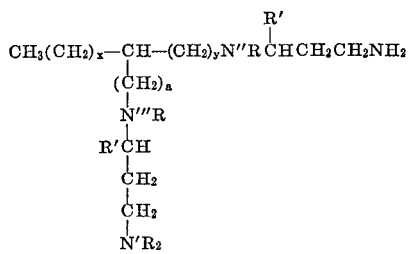

where

R is a radical selected from the group consisting of H—, $CH_3$—, $H(OCH_2CH_2)_e$—,

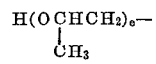

and mixtures thereof where $e=1$ to 100
R' is a radical selected from the group consisting of H— and $CH_3$—
$a=0$ to 2
$x+y=6$ to 22.

2. The fatty tetraamine of claim 1 being N''',N''-di-(3-aminopropyl)aminomethylstearylamine.

3. The fatty tetraamine alkyl derivative of claim 1 being hexamethyl N''',N''-di(3-aminopropyl)aminomethylstearylamine.

4. The fatty tetraamine alkoxy derivative of claim 1 being ethoxylated N''',N''-di-(3-aminopropyl)aminomethylstearylamine.

5. The fatty tetraamine alkoxy derivative of claim 1 being propoxylated N''',N''-di-(3-aminopropyl)aminomethylstearylamine.

References Cited

UNITED STATES PATENTS 2,166,152  7/1939  Howk.
2,267,204  12/1941  Kyrides.
2,390,766  12/1945  Zellhoefer et al.
3,200,155  8/1965  Kirkpatrick et al.
3,236,835  2/1966  Rabourn.

CHARLES B. PARKER, Primary Examiner
R. L. RAYMOND, Assistant Examiner

U.S. Cl. X.R.
260—2, 465.8, 584; 262—351

UNITED STATES PATENT OFFICE
CERTIFICATE OF CORRECTION

Patent No. 3,510,521            May 5, 1970

Eugene J. Miller, Jr., et al.

It is certified that error appears in the above identified patent and that said Letters Patent are hereby corrected as shown below:

Column 9, claim I, the first formula should appear as shown below:

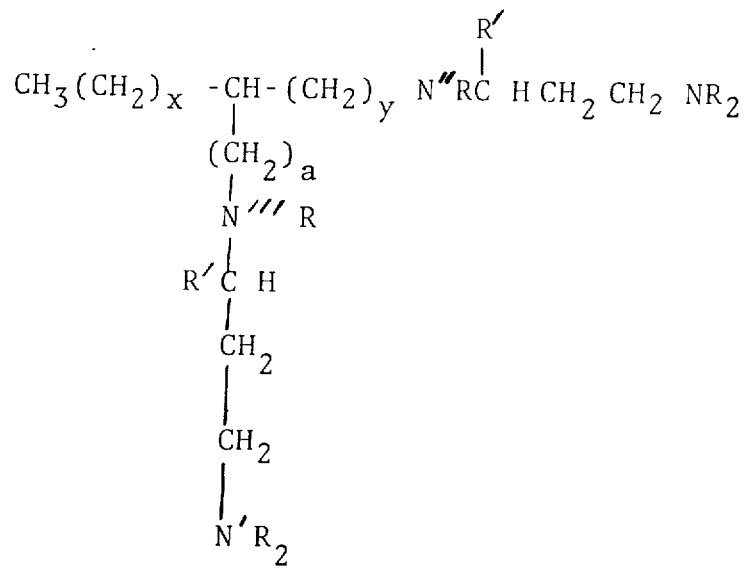

Signed and sealed this 16th day of February 1971.

(SEAL)
Attest:

EDWARD M. FLETCHER, JR.
Attesting Officer

WILLIAM E. SCHUYLER, JR.
Commissioner of Patents